US012739692B2

(12) United States Patent
Moon et al.

(10) Patent No.: US 12,739,692 B2
(45) Date of Patent: Sep. 15, 2026

(54) METHOD AND APPARATUS FOR OFFLOADING TRAFFIC IN A WIRELESS COMMUNICATION

(71) Applicant: Samsung Electronics Co., Ltd., Gyeonggi-do (KR)

(72) Inventors: Younggyoun Moon, Gyeonggi-do (KR); Dongmyung Kim, Gyeonggi-do (KR); Sunghwan Kim, Gyeonggi-do (KR); Yoonseon Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 919 days.

(21) Appl. No.: 18/095,622

(22) Filed: Jan. 11, 2023

(65) Prior Publication Data

US 2024/0073733 A1 Feb. 29, 2024

(30) Foreign Application Priority Data

Aug. 31, 2022 (KR) ........................ 10-2022-0109741

(51) Int. Cl.
*H04W 24/08* (2009.01)
*H04W 28/02* (2009.01)

(52) U.S. Cl.
CPC ....... *H04W 28/0236* (2013.01); *H04W 24/08* (2013.01)

(58) Field of Classification Search
CPC ......................... H04W 28/0236; H04W 24/08; H04L 47/125; H04L 47/283; H04L 47/29; H04L 41/14; H04L 43/0888; H04L 43/0894
See application file for complete search history.

(56) References Cited

U.S. PATENT DOCUMENTS 7,124,293 B2 10/2006 Mualem et al.
8,930,690 B2 1/2015 Zuo et al.
(Continued)

FOREIGN PATENT DOCUMENTS

EP 3 799 467 3/2021
KR 10-2020-0064135 6/2020
(Continued)

OTHER PUBLICATIONS

International Search Report dated May 22, 2023 issued in counterpart application No. PCT/KR2023/000309, 6 pages.
(Continued)

*Primary Examiner* — Kevin T Bates
*Assistant Examiner* — Hector Reyes
(74) *Attorney, Agent, or Firm* — The Farrell Law Firm, P.C.

(57) ABSTRACT

Disclosed is a 5G or 6G communication system to be provided for supporting higher data rates beyond a 4G communication system such as LTE. In particular, a method performed by a first device in a communication system is disclosed, and includes detecting a need to update a traffic processing rule in a second device processing traffic together with the first device; determining whether to update the traffic processing rule to be used in the second device based on performance information of the first device and performance profile information of the second device; and delivering information related to the update of the traffic processing rule to the second device based on the determination.

18 Claims, 16 Drawing Sheets

(56) References Cited

U.S. PATENT DOCUMENTS

| | | | | |
|---|---|---|---|---|
| 2014/0241317 | A1* | 8/2014 | Jamadagni | H04L 5/0032 370/329 |
| 2015/0215832 | A1* | 7/2015 | Fitzpatrick | H04W 36/04 455/426.1 |
| 2015/0223093 | A1* | 8/2015 | Zhang | H04W 28/0268 370/252 |
| 2016/0219481 | A1* | 7/2016 | Wang | H04W 28/0864 |
| 2020/0067822 | A1 | 2/2020 | Malhotra et al. | |
| 2020/0195558 | A1 | 6/2020 | Schultz et al. | |
| 2020/0245383 | A1 | 7/2020 | Lu et al. | |
| 2020/0366559 | A1* | 11/2020 | Parvataneni | H04L 41/5025 |
| 2021/0258969 | A1 | 8/2021 | Yang et al. | |
| 2022/0240157 | A1 | 7/2022 | Villasante Marcos et al. | |
| 2022/0321481 | A1 | 10/2022 | Jeong et al. | |
| 2023/0269182 | A1* | 8/2023 | Li | H04L 69/163 370/392 |
| 2023/0344774 | A1* | 10/2023 | Abdelmalek | H04L 47/24 |
| 2025/0176056 | A1* | 5/2025 | Talebi Fard | H04L 45/74 |

FOREIGN PATENT DOCUMENTS

| | | |
|---|---|---|
| KR | 10-2021-0059728 | 5/2021 |
| KR | 10-2021-0088673 | 7/2021 |
| WO | WO 2021/049899 | 3/2021 |
| WO | WO 2022/075528 | 4/2022 |
| WO | WO 2022/123532 | 6/2022 |

OTHER PUBLICATIONS

Firestone, Daniel etc., "Azure Accelerated Networking: SmartNICs in the Public Cloud", Proceedings of the 15th USENIX Symposium on Networked Systems Design and Implementation (NSDI '18). Apr. 9-11, 2018 • Renton, WA, USA, pp. 15.

NVIDIA, "OVS Offload Using ASAP2 Direct", © 2022 NVIDIA Corporation & affiliates, https://docs.nvidia.com/networking/x/ZQHuAg, pp. 35.

Miao, Rui et al., "SilkRoad: Making Stateful Layer-4 Load Balancing Fast and Cheap Using Switching ASICs", SIGCOMM '17, Aug. 21-25, 2017, Los Angeles, CA, USA, pp. 14.

Moon, Younggyoun et al., "AccelTCP: Accelerating Network Applications with Stateful TCP Offloading", Proceedings of the 17th USENIX Symposium on Networked Systems Design and Implementation (NSDI '20) Feb. 25-27, 2020 • Santa Clara, CA, USA, pp. 17.

Bose, Abhik et al., "Leveraging Programmable Dataplanes for a High Performance 5G User Plane Function", APNet 2021, Jun. 24-25, 2021, Shenzhen, China, pp. 8.

Macdavid, Robert et al., "A P4-based 5G User Plane Function", SOSR '21, Oct. 11-12, 2021, Virtual Event, USA, pp. 7.

Katsikas, Georgios P. et al., "What you need to know about (Smart) Network Interface Cards", Passive and Active Measurement. PAM 2021, Lecture Notes in Computer Science(), vol. 12671. Springer, Cham., pp. 19.

Intel, Samsung, "Samsung Achieves 305 Gbps on 5G UPF Core Utilizing Intel® Architecture", © 2020 Intel Corporation Printed in USA, pp. 7.

* cited by examiner

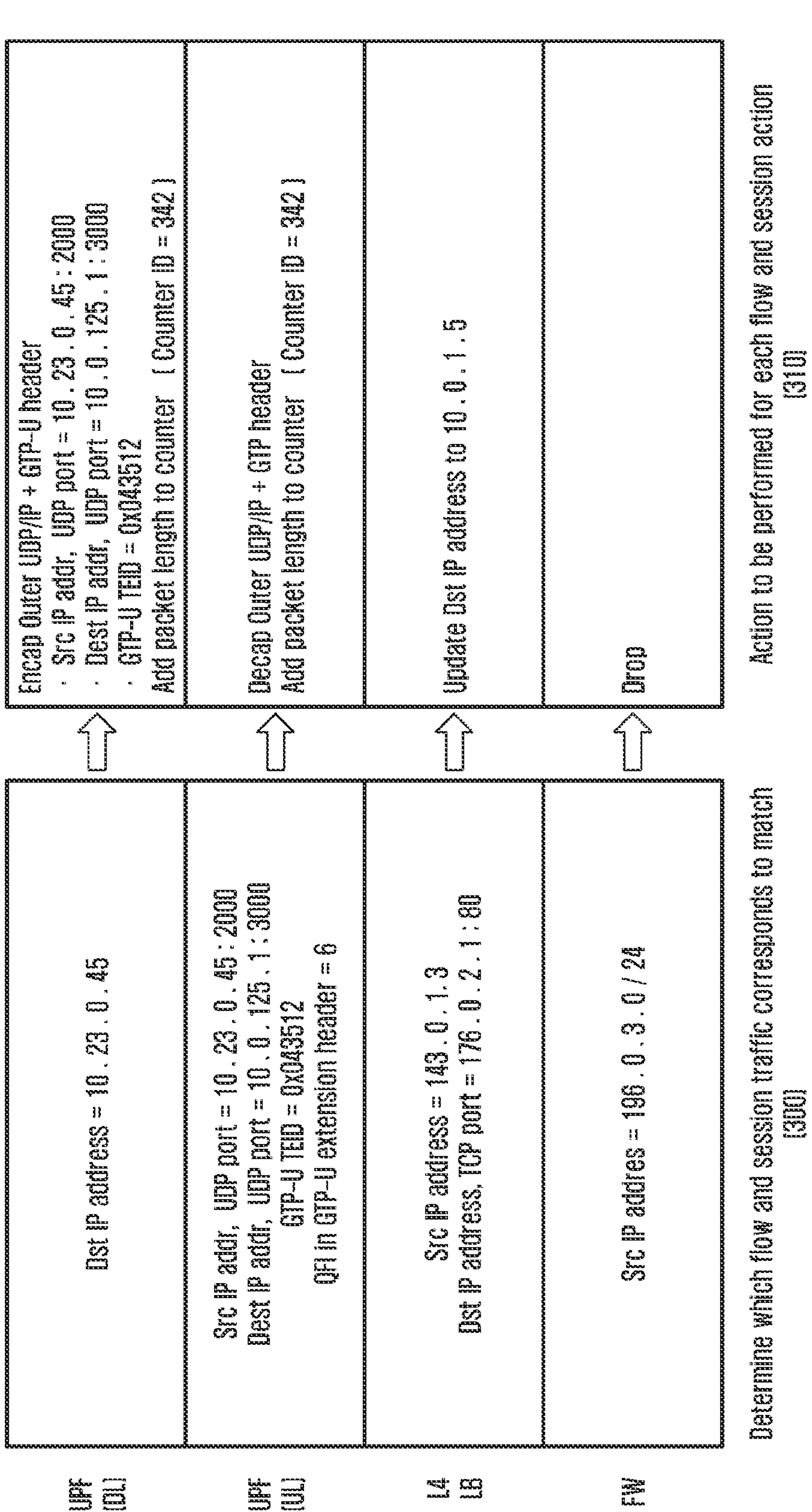
FIG. 3A
UPF (DL)
UPF (UL)
L4 LB
FW
Dst IP address = 10 . 23 . 0 . 45
Src IP addr, UDP port = 10 . 23 . 0 . 45 : 2000
Dest IP addr, UDP port = 10 . 0 . 125 . 1 : 3000
GTP-U TEID = 0x043512
QFI in GTP-U extension header = 6
Src IP address = 143 . 0 . 1 . 3
Dst IP address, TCP port = 176 . 0 . 2 . 1 : 80
Src IP addres = 196 . 0 . 3 . 0 / 24
Determine which flow and session traffic corresponds to match
(300)
Encap Outer UDP/IP + GTP-U header
· Src IP addr, UDP port = 10 . 23 . 0 . 45 : 2000
· Dest IP addr, UDP port = 10 . 0 . 125 . 1 : 3000
· GTP-U TEID = 0x043512
Add packet length to counter ( Counter ID = 342 )
Decap Outer UDP/IP + GTP header
Add packet length to counter ( Counter ID = 342 )
Update Dst IP address to 10 . 0 . 1 . 5
Drop
Action to be performed for each flow and session action
(310)

FIG. 3B

Table 1 (320) UPF

· Action type = 1 → Encap GTP-U and add packet length to counter
· Action type = 2 → Decap GTP-U and add packet length to counter

| Match | | | | | | Action | | | | | | |
|---|---|---|---|---|---|---|---|---|---|---|---|---|
| GTP-U exists ? | Src IP | Src UDP port | Dst IP | Dst UDP port | GTP-U TEID | Action type | Src IP | Src UDP port | Dst IP | Dst UDP port | GTP-U TEID | Counter ID |
| 0 | | | 10.23.0.45 | | | 1 | 10.0.96.4 | 2000 | 10.0.125.1 | 3000 | 0x043F12 | 342 |
| 0 | | | 10.23.0.48 | | | 1 | 10.0.96.4 | 2000 | 10.0.125.1 | 3000 | 0x043F43 | 343 |
| 1 | 10.0.96.4 | 2000 | 10.0.125.1 | 3000 | 0x043F12 | 2 | | | | | | 342 |
| 1 | 10.0.96.4 | 2000 | 10.0.125.1 | 3000 | 0x043F43 | 2 | | | | | | 343 |
| | | | | | | | | | | | | |

Table 2 (330) Firewall + L4 Load balancer

| Match | | | Action | |
|---|---|---|---|---|
| Src IP | Dst IP | Dst TCP port | Action type | Dst IP |
| 196.0.83.0/24 | | | 1 | |
| 196.0.84.20/24 | | | 1 | |
| 143.0.1.3 | 176.0.2.1 | 80 | 2 | 10.0.1.5 |
| 143.0.1.6 | 176.0.2.1 | 80 | 2 | 10.0.1.6 |
| | | | | |

· Action type = 1 → Drop
· Action type = 2 → Update Dst IP address and forward

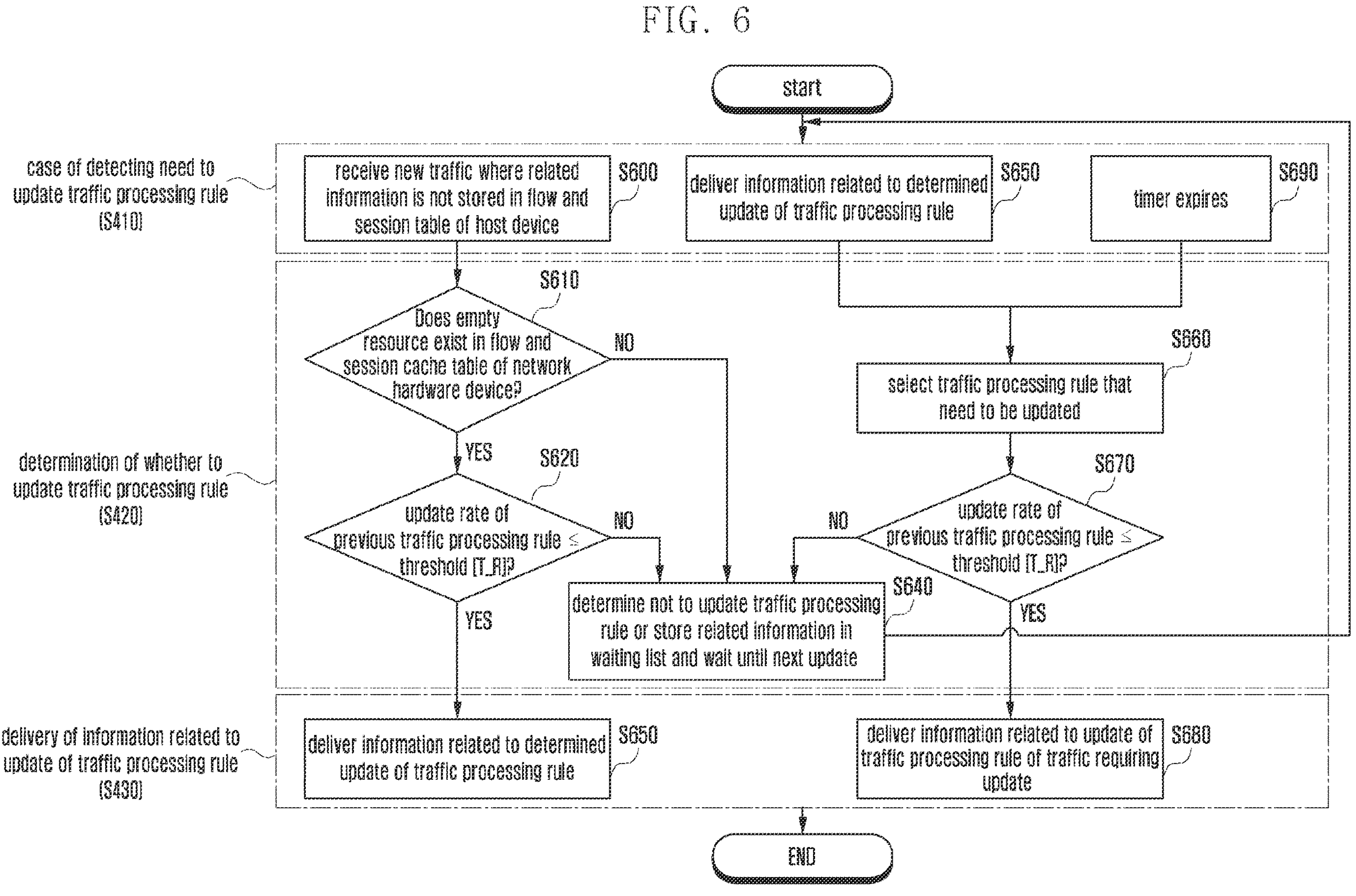
FIG. 6
start
case of detecting need to update traffic processing rule (S410)
receive new traffic where related information is not stored in flow and session table of host device
S600
deliver information related to determined update of traffic processing rule
S650
timer expires
S690
determination of whether to update traffic processing rule (S420)
S610
Does empty resource exist in flow and session cache table of network hardware device?
NO
YES
S620
update rate of previous traffic processing rule ≤ threshold (T_R)?
NO
YES
S660
select traffic processing rule that need to be updated
S670
update rate of previous traffic processing rule ≤ threshold (T_R)?
NO
YES
determine not to update traffic processing rule or store related information in waiting list and wait until next update
S640
delivery of information related to update of traffic processing rule (S430)
deliver information related to determined update of traffic processing rule
S650
deliver information related to update of traffic processing rule of traffic requiring update
S680
END

FIG. 11 start detect need for update of traffic processing rule

S1140 update rate of previous traffic processing rule ≤ threshold (T_R)?

Figure 11:
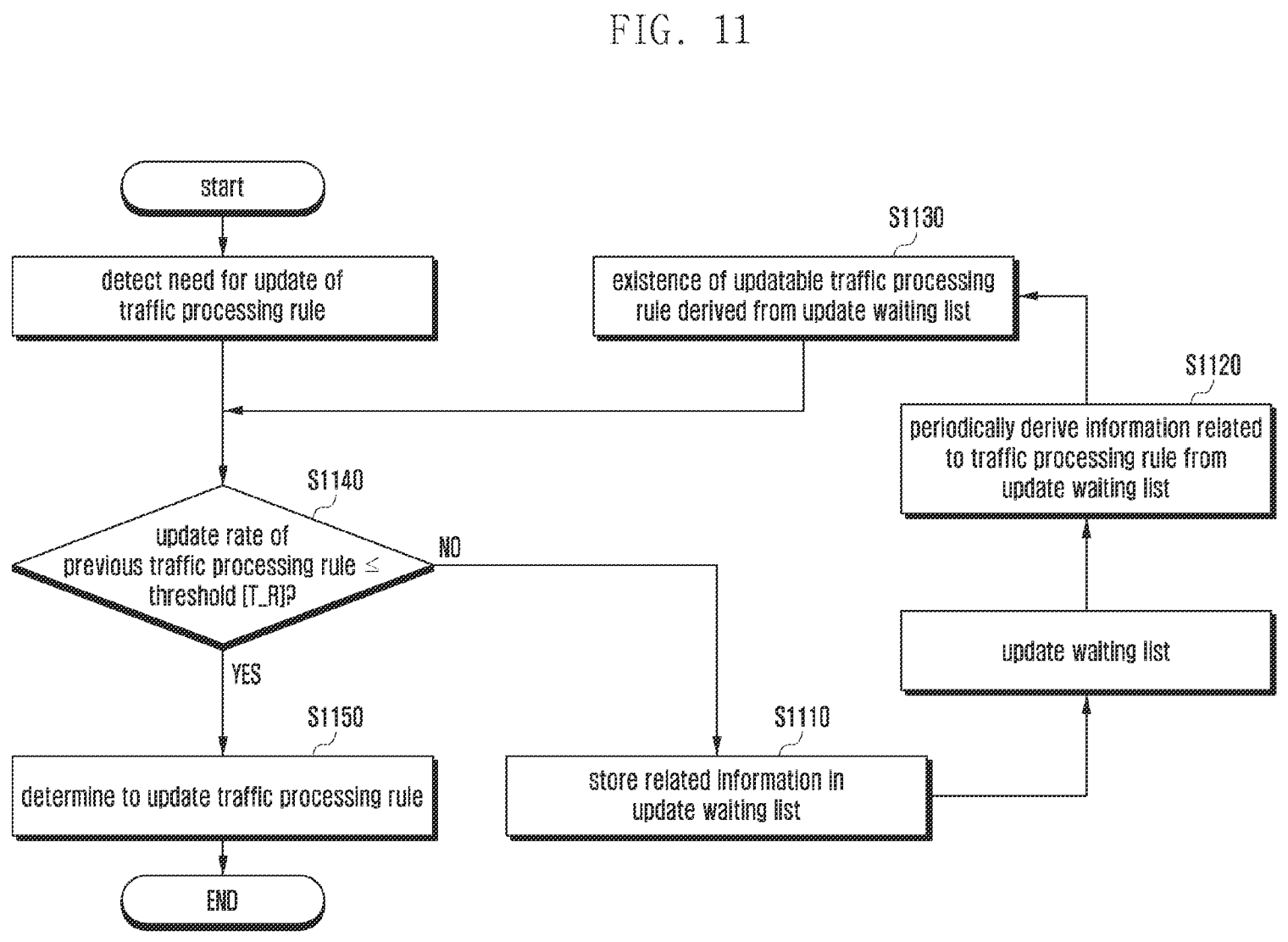

NO

YES

S1150 determine to update traffic processing rule

END

S1110 store related information in update waiting list update waiting list

S1120 periodically derive information related to traffic processing rule from update waiting list

S1130 existence of updatable traffic processing rule derived from update waiting list

METHOD AND APPARATUS FOR OFFLOADING TRAFFIC IN A WIRELESS COMMUNICATION

CROSS REFERENCE TO RELATED APPLICATION

The present application is based on and claims the benefit of Korean Patent Application No. 10-2022-0109741, which was filed in the Korean Intellectual Property Office on Aug. 31, 2022, the entire content of which is incorporated herein by reference.

BACKGROUND

1. Field

The disclosure relates to a communication system, and more particularly, to a method and apparatus for efficient data transmission and reception between a base station and a terminal through offloading traffic in a communication system.

2. Description of Related Art

Considering the development of wireless communication over the years, the technologies have been developed mainly for services targeting humans, such as voice calls, multimedia services, and data services. However, following the commercialization of $5^{th}$ generation (5G) communication systems, it is expected that connected devices, which are exponentially growing, will be connected to communication networks. Examples of connected things include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in a 6th-generation (6G) era, there have been ongoing efforts to develop improved 6G communication systems. 6G communication systems may be referred to as beyond-5G systems.

6G communication systems, which are expected to be commercialized around 2030, will have a peak data rate of tera (1,000 giga)-level bps and a radio latency less than 100 μsec, which will be 50 times faster than 5G communication systems and have 1/10 of the radio latency thereof.

In order to accomplish such a high data rate and an ultra-low latency, it has been considered to implement 6G communication systems in a terahertz band (e.g., 95 GHz to 3 THz bands). It is expected that, due to more severe path loss and atmospheric absorption in the terahertz bands than those in mmWave bands introduced in 5G, technologies capable of securing the signal transmission distance, i.e., coverage, will become more crucial. Thus, it is desirable to develop, as major technologies for securing the coverage, radio frequency (RF) elements, antennas, novel waveforms having a better coverage than orthogonal frequency division multiplexing (OFDM), beamforming and massive multiple-input and multiple-output (MIMO), full dimensional (FD)-MIMO, array antennas, and multiantenna transmission technologies such as large-scale antennas. In addition, there has been ongoing discussions on new technologies for improving the coverage of terahertz-band signals, such as metamaterial-based lenses and antennas, high-dimensional spatial multiplexing technology using orbital angular momentum (OAM), and reconfigurable intelligent surface (RIS).

In order to improve spectral efficiency and overall network performance, the following technologies have been developed for 6G communication systems: a full-duplex technology for allowing an uplink (UL) transmission and a downlink (DL) transmission to simultaneously use the same frequency resource at the same time, a network technology for utilizing satellites, high-altitude platform stations (HAPS), etc., in an integrated manner, an improved network structure for supporting mobile base stations and the like and allowing network operation optimization and automation and the like, a dynamic spectrum sharing technology via collision avoidance based on a prediction of spectrum usage, an artificial intelligence (AI) based communication technology that utilizes the AI from a designing phase and internalizes end-to-end AI support functions to realize system optimization, and a next-generation distributed computing technology that realizes complex services beyond the limit of terminal computing ability by utilizing super-high-performance communication and computing resources (such as mobile edge computing (MEC), clouds, etc.). In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwareization of network entities, and increase the openness of wireless communications are continuing.

It is expected that research and development of 6G communication systems in hyper-connectivity, including person to machine as well as machine to machine, will allow the next hyper-connected experience. Particularly, it is expected that services such as truly immersive extended reality (XR), high-fidelity mobile holograms, and digital replicas could be provided through 6G communication systems. In addition, services such as remote surgery for security and reliability enhancement, industrial automation, and emergency response will be provided through the 6G communication system, such that the technologies could be applied in various fields such as industry, medical care, automobiles, and home appliances.

On the other hand, as communication systems develop, traffic throughput has increased rapidly. For example, in the case of a user gateway (e.g., 5G user plane function (UPF)) in which session information is frequently changed due to high mobility of terminals in a mobile communication system or a front-end gateway that processes traffic flows of multiple users in a cloud system, traffic processing rules may change frequently.

In addition, a specific flow and session may be changed from an idle state to an active state or from an active state to an idle state. In this case, a traffic processing rule needs to be immediately added to or removed from the cache of a network hardware device according to the change of state.

Accordingly, research on a method and apparatus for improving traffic processing performance through the use of a network hardware device is required.

SUMMARY

An aspect of the disclosure provides a method of dynamically updating a traffic processing rule to be processed by a network hardware device so that a part of traffic to be processed by a host device can be offloaded on the network hardware device.

Another aspect of the disclosure provides a method of updating a traffic processing rule in real time in consideration of the performance of a network hardware device.

Another aspect of the disclosure provides a method for updating a traffic processing rule in consideration of the state change of flow and session in order to solve a problem in which traffic processing performance is degraded in a mobile communication system in which the state change of flow and session state is frequent due to the mobility of a terminal.

In accordance with the above aspects, a method performed by a first device in a communication system includes detecting a need to update a traffic processing rule in a second device processing traffic together with the first device; determining whether to update the traffic processing rule to be used in the second device based on performance information of the first device and performance profile information of the second device; and delivering information related to the update of the traffic processing rule to the second device based on the determination.

In accordance with the above aspects, a method performed by a second device processing traffic together with a first device in a communication system includes measuring a packet transmission rate and a packet transmission delay time of the second device per unit time; and delivering measurement information including a measurement value of the packet transmission rate and packet transmission delay time measured per the unit time to the first device, wherein the measurement information is used to determine whether to update the traffic processing rule by the first device to the second device.

In accordance with the above aspects, a first device in a communication system, includes a transceiver to transmit and receive a signal; and a controller connected to the transceiver, wherein the controller detects a need to update a traffic processing rule in a second device processing traffic together with the first device, determines whether to update the traffic processing rule to be used in the second device based on performance information of the first device and performance profile information of the second device, and deliver information related to the update of the traffic processing rule to the second device based on the determination.

In accordance with the above aspects, a second device which processes traffic together with a first device in a communication system, includes a transceiver to transmit and receive a signal; and a controller connected to the transceiver, wherein the controller measures a packet transmission rate and a packet transmission delay time of the second device per unit time, and delivers measurement information including a measurement value of the packet transmission rate and packet transmission delay time measured per unit time to the first device, and the measurement information is used to determine whether to update the traffic processing rule by the first device to the second device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3A illustrates a traffic processing rule and a flow and session table according to an embodiment;

FIG. 3B illustrates a traffic processing rule and a flow and session table according to an embodiment;

FIG. 6 is a flowchart in a case where a host device detects a need to change a traffic processing rule according to an embodiment;

FIG. 11 is a flowchart illustrating a case of storing information related to a traffic processing rule in a waiting list of a hardware offload controller in a case where the traffic processing rule cannot be updated according to an embodiment;

DETAILED DESCRIPTION

Figure 1:
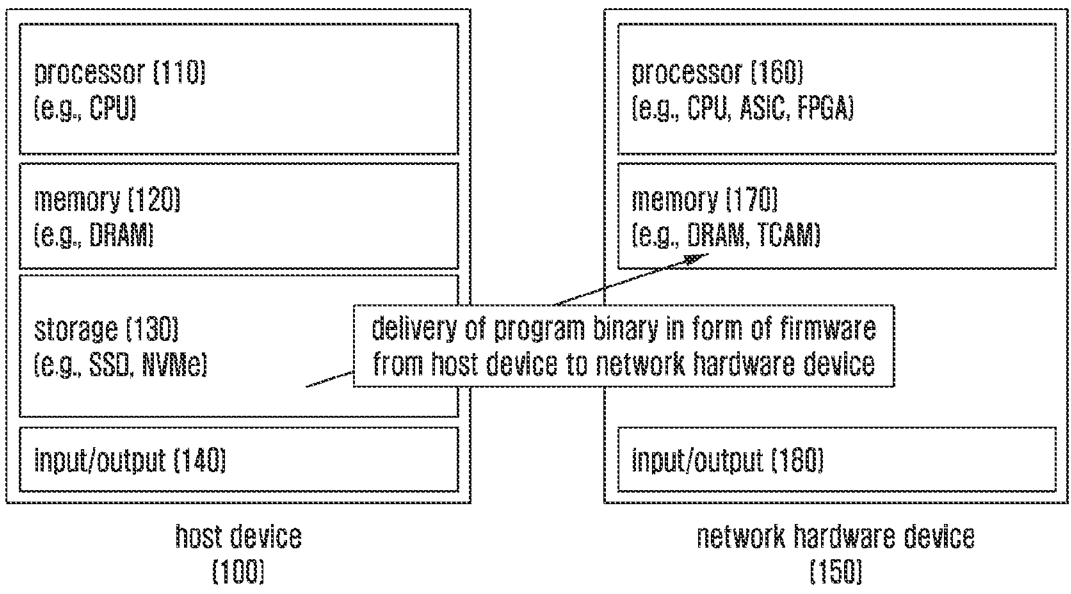
FIG. 1 illustrates structures and correlations between a host device and a network hardware device as an example for explaining the concept of the disclosure.

In describing the embodiments of the disclosure herein, explanation of the technical contents that are well known in the art to which the disclosure pertains and are not directly related to the disclosure will be omitted to avoid obscuring the subject matter of the disclosure and to transfer the same more accurately.

For the same reason, in the accompanying drawings, some constituent components are exaggerated, omitted, or roughly illustrated. Further, sizes of some constituent components may not completely reflect the actual sizes thereof. In the drawings, the same drawing reference numerals are used for the same components across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and components, are nothing but specific details provided to assist those of ordinary skill in the art in a comprehensive understanding of the disclosure, and the disclosure is only defined within the scope of the appended claims.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'unit', as used in an embodiment, means, but is not limited to, a software or hardware component, such as a field programmable gate array (FPGA) or application specific integrated circuit (ASIC), which performs certain tasks. However, the term 'unit' does not mean that it is limited to software or hardware. The unit may advantageously be configured to reside on the addressable storage medium and configured to execute on one or more processors. Thus, the unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and the units may be combined into fewer components and units or further separated into additional components and units. In addition, components and units may be implemented to reproduce one or more CPUs in a device or a security multimedia card.

Recently, there is a trend of softwareization and virtualization of network functions in a communication system including a base station and a core network. This brought the advantages of horizontal scaling according to traffic load, efficiency of resources, reduction of time required to add new functions and upgrades, but on the contrary, traffic volume increased rapidly and limitations occurred in terms of performance and energy. Therefore, considering the network bandwidth and traffic requirements at the time of 6G commercialization, a new technology for efficiently processing traffic is required. Hereinafter, a method and apparatus for improving operational performance of a network function processing traffic will be described.

FIG. 1 illustrates structures and correlations between a host device 100 and network hardware device 150 as an example for explaining the concept of the disclosure.

The host device 100 may be various electronic devices connected to a network, such as a computer, a laptop computer, a mobile phone, and a tablet PC, etc. The host device 100 may include one or more processors 110, a memory 120, a storage 130, and an input/output (I/O) 140.

The processor 110 interprets the commands of the program and executes the commands, and may include a central processing unit (CPU).

The memory 120 temporarily stores data to be processed by the processor 110 so that the processor can quickly access the data. The memory 120 may include random access memory (RAM), read only memory (ROM), and dynamic random access memory (DRAM).

The storage 130 stores a program, which is a set of commands that operates on the processor 110, and the storage 130 may include a solid state drive (SSD) and a non-volatile memory express (NVMe), as an example.

The input/output (I/O) 140 allows information to be exchanged between the processor and the memory and an external device, and may include peripheral component interconnect express (PCIe), direct memory access (DMA), remote direct memory access (RDMA), and Ethernet.

The network hardware device 150 may include a device for supplementing performance of the host device 100 by performing all or part of the functions of the host device 100. The network hardware device 150 may include programmable hardware such as a smart network interface card (SmartNIC) and a programmable switch.

The network hardware device 150 may be connected to an external network and transfer the traffic transmitted from the network to the host device 100. The network hardware device 150 may forward the traffic incoming to a network port (Ethernet) to another network port (Ethernet) after partially modifying a header or content of a packet according to a traffic processing rule, and may forward the traffic incoming to the network port (Ethernet) to the host device 100 through the PCIe port. Alternatively, the network hardware device 150 may forward the traffic incoming to the host device 100 through the PCIe port to another network port (Ethernet).

The network hardware devices 150 may include one or more processors 160, a memory 170, and an input/output 180.

The processor 160 may interpret the commands of the program and execute the commands. The processor 160 includes a central processing unit (CPU), an application specific integrated circuit (ASIC), and a field programmable gate array (FPGA) capable of processing the packet for traffics and performing arbitrary operations, and may supplement the performance of the host device 100.

The memory 170 temporarily stores data to be processed by the processor 160 so that the processor 160 can quickly access the data. The memory 170 may include a memory with a very high access speed but a small size, such as ternary content addressable memory (TCAM) or DRAM.

The input/output 180 allows information to be exchanged between the CPU/memory and an external device, and may include PCIe, DMA, RDMA, and Ethernet.

A process for the network hardware device 150 to supplement the functions of the host device 100 may be as follows.

The programs may be stored in the storage 130 of the host device 100. When a program is started, the processor 110 of the host device 100 may access the storage 130 and convert part of the program stored in the host device into usable data that can be accessed through the memory 120. Thereafter, the processor 110 may access the data of the memory 120 and perform commands such as packet processing.

Meanwhile, in order for the network hardware device 150 to supplement the functions of the host device 100, the processor 160 of the network hardware device 150 may perform part of commands that are executed by the processor 110 of the host device 100. Accordingly, the program stored in the storage 130 of the host device 100 is delivered to the memory 170 of the network hardware in the form of firmware, and the memory 170 of the network hardware can execute a corresponding program. Thereafter, the processor 160 of the network hardware accesses the memory 170 of the network hardware and executes commands, thereby partially supplementing the functions of the host device 100.

As described below, the phrase "flow and session" may refer to a set of traffic having the same characteristics. For example, a protocol data unit (PDU) session connected between a terminal and a core network (e.g., UPF) may be included in order to transmit and receive traffic in a communication system. Alternatively, a quality of service (QoS) flow, which is a minimum unit for identifying QoS in a PDU session, may be included.

In the disclosure, the "traffic processing rule" may refer to criteria determined to classify the traffic delivered to a host device through a network to which flow and session the traffic corresponds to, and to perform a specific action on the traffic according to the classification result. For example, the traffic processing rule may include a traffic classification criteria and an action to be processed for the classified traffic.

In the disclosure, the term "offload" may mean that a network hardware device performs some of the functions of the host device in order to improve the performance of the host device. Alternatively, it may mean that part of the function of the host device 100 is delivered to the network hardware device 150, and the traffic to be processed by the host device 100 is delivered to the network hardware device 150. The disclosure will be described based on the case in which one or more traffic processing rules among traffic processing rules stored in the host device 100 is updated to the network hardware device 150 so that the network hardware device 150 performs part of the traffic processing function in the host device 100, but is not limited thereto.

In the disclosure, the "update" of traffic processing rule may include the cases of adding, deleting, or changing one or more traffic processing rules among the traffic processing rules stored in the host device 100 to the network hardware device 150.

Figure 2A:
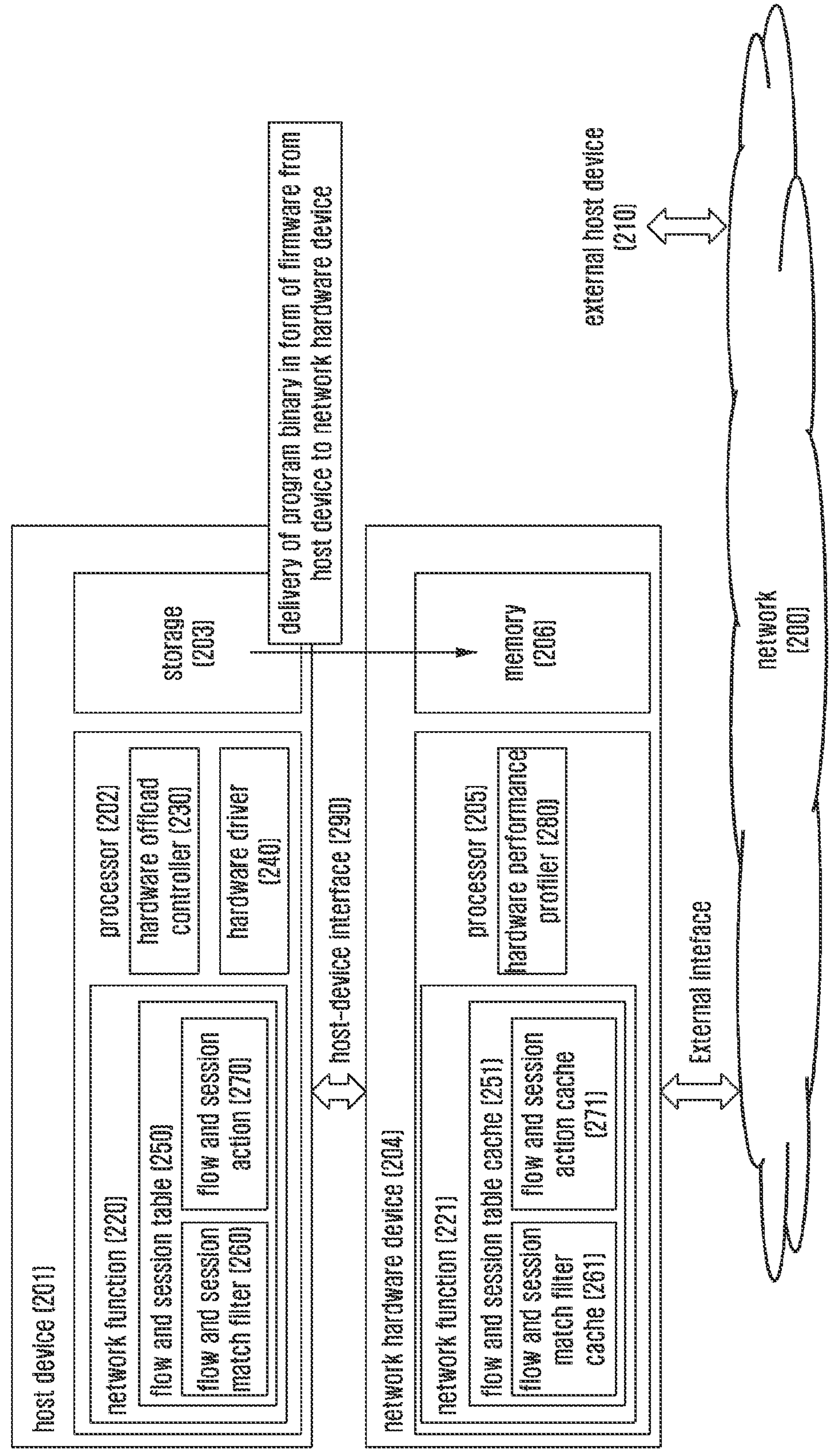
FIG. 2A illustrates processors of a host device and a network hardware device divided by function, as applied to the disclosure.
Figure 2B:
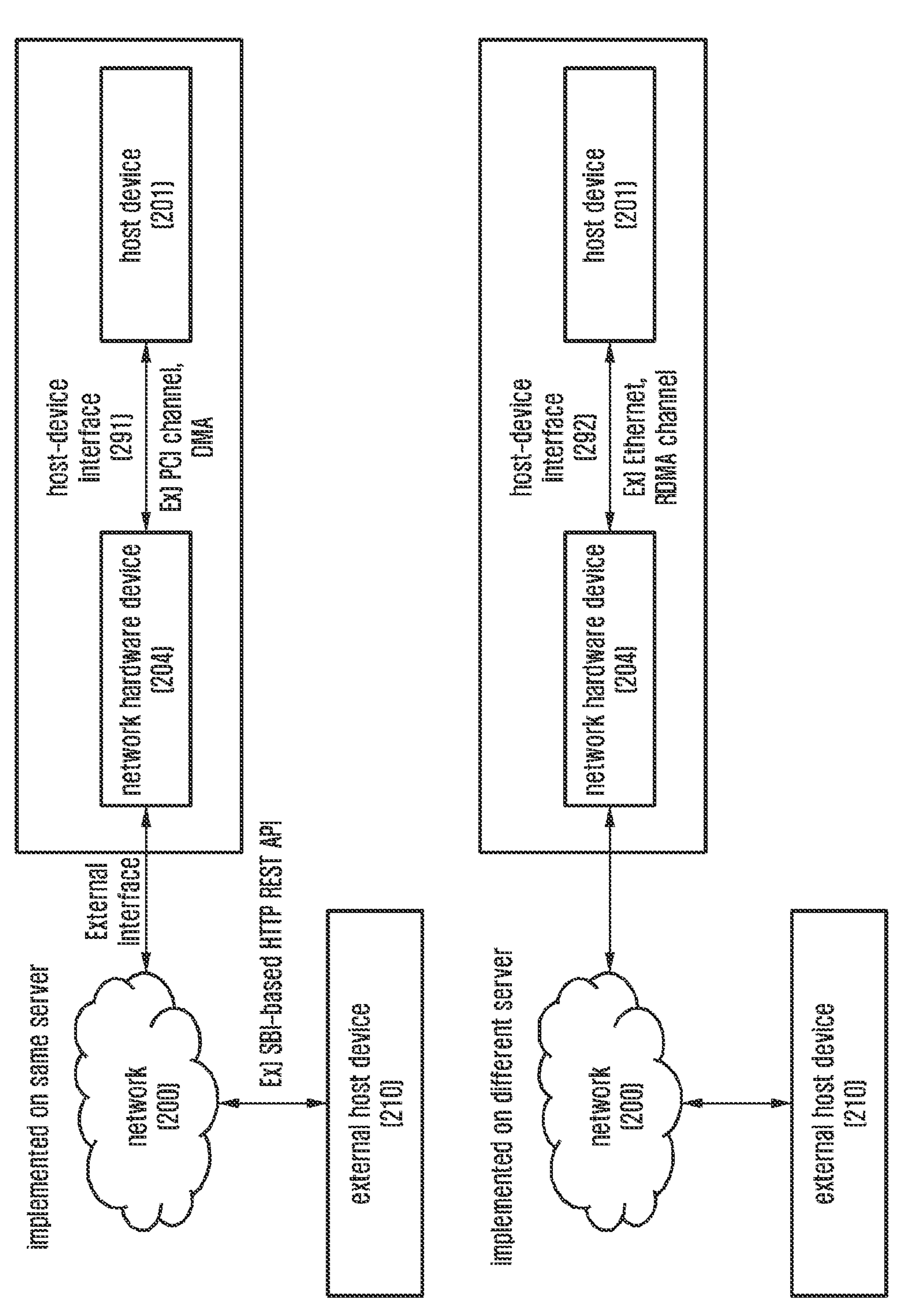
FIG. 2B illustrates a host device and a network hardware device implemented in the same server and different servers according to an embodiment.

FIG. 2A illustrates processors of a host device 201 and a network hardware device 204 divided by a function. FIG. 2B illustrates cases in which the host device 201 and the network hardware device 204 are implemented in the same server and different servers.

FIG. 2A illustrates the processors of the host device 201 and the network hardware device 204 divided by function.

The host device 201 may include a network function 220, a hardware offload controller 230, and a hardware driver 240.

The network function 220 may perform a function of processing data in order to transmit and receive data. The network function 220 may perform the following operations to process data.

Specifically, the network function 220 may modify all or part of the received data to change information to be used for a transmission protocol (e.g., a data transmission path) or may perform an operation of adding or deleting all or part of the received data. In addition, the network function 220 may perform an operation including a series of processes of delivering data from an upper layer to a lower layer for data transmission or delivering data to an upper layer for data reception. However, the operation performed by the network function 220 is not limited to the above embodiment.

The network function 220 may modify a packet header field included in data traffic or add or delete a protocol header, and an operation performed may vary depending on information on the modified packet header.

The network function 220 may include a flow and session table 250 for processing delivered traffic. The flow and session table 250 may include a flow and session match filter 260 defining conditions for classifying traffic according to characteristics and a flow and session action 270 defining an action performed for each corresponding flow and session. A specific example will be described with respect to FIGS. 3A and 3B.

The hardware offload controller 230 may control overall operations related to traffic offloading. The hardware offload controller 230 may determine whether to update the traffic processing rule of the network hardware device 204. The hardware offload controller 230 according to an embodiment may determine whether to update the traffic processing rule based on the performance profile information of a network hardware device including one or more pieces of performance information of the network hardware device 204. In addition, the hardware offload controller 230 may immediately determine whether to update the traffic processing rule in the case of receiving a control message from any external host device 210. The hardware offload controller 230 may operate at the stage of the network function 220 or hardware driver 240.

The hardware driver 240 may update the traffic processing rule in the network hardware device 204 according to the decision of the hardware offload controller 230. For example, part of traffic processing rule defined in the flow and session table 250 of the host device 201 may be delivered to the network hardware device 204 through a host-device interface 290.

The network hardware device 204 may include a network function 221 for data processing and a hardware performance profiler 280.

The network function 221 of the network hardware device 204 may include a flow and session table cache 251. The flow and session table cache 251 may include a flow and session match filter cache 261 and a flow and session action cache 271, respectively, and each may include some items of the flow and session table 250, the flow and session match filter 260, and the flow and session action 270.

A hardware performance profiler 280 may measure performance of the network hardware device 204 and report measurement information to the host device 201.

The host-device interface 290 may include a path through which information is delivered between the host device 201 and the network hardware device 204.

The external host device (a remote node) 210 may share the performance profile information of the network hardware and provide the performance profile information of the network hardware to the hardware offload controller 230 in the case that one or more servers are connected to the same network hardware device 204.

FIG. 2B illustrates cases in which the host device 201 and the network hardware device 204 are implemented on the same server and the case in which the host device 202 and the network hardware device 204 are implemented on different servers.

The host device 201 and the network hardware device 204 may be implemented on the same server. In the case that the host device 201 and the network hardware device 204 are implemented on the same server, information can be delivered in the form of PCI messages through a PCI channel. Alternatively, the information may be delivered through DMA 291.

The host device 201 and network hardware device 204 may be implemented on different servers. In the case that the host device 201 and the network hardware device 204 are implemented on different servers, the information may be delivered through an Ethernet or an RDMA channel 292.

FIGS. 3A and 3B illustrate traffic processing rules and a flow and session tables. The flow and session table may refer to a set of traffic processing rules. The traffic processing rule may include a condition (match) 300 for determining which flow and session the traffic (hereinafter "incoming traffic") delivered to the host device and network hardware device corresponds to and an action 310 to be performed for each corresponding flow and session.

FIG. 3A illustrates examples of traffic processing rules of UPF, L4 load balancer, and firewall.

According to the traffic processing rule of FIG. 3A, in the case of receiving new UPF traffic, a UPF can determine which flow the new traffic corresponds to. As a result of the determination, if the Dst IP address of the traffic corresponds to 10.23.0.45 (match), information such as Src IP addr=10.23.0.45, UDP port=2000, Dest IP addr-10.0.125.1, UDP port=3000, GTP-U TEID=0x043512 is added to the header of the corresponding traffic for encapsulation, and the length of the packet is added to Counter ID=342 (action).

FIG. 3B illustrates a flow and session table, which is a set of traffic processing rules.

The traffic delivered to the UPF can be processed as follows according to the flow and session table. Action type1 described in the table means performing encapsulation of the GTP-U packet and adding the length value of the packet to a corresponding counter. Action type 2 means performing decapsulation of the GTP-U packet and adding the length value of the packet to a corresponding counter.

Specifically, the UPF may receive DL traffic to be delivered to the UE through the gNB. The UPF can determine which flow and session the received traffic corresponds to. In the case of determining that the GTP-U value of the traffic is 0 and the Dst IP value corresponds to 10.23.0.45 (match), Action type 1 is performed. That is, the header value indicating that the Src IP value is 10.0.96.4, the Src UPD port value is 2000, the Dst IP value is 10.0.125.1, the Dst UDP port value is 3000, the GTP-U TEID value of 0x043F12 is added, and the length value of the packet is added to Counter ID 342.

In the same way, a process of processing the UL traffic delivered from the UE to the UPF through the gNB may be as follows. In the case of determining (match) that the received traffic has a GTP-U value of 1, an Src IP value of 10.0.96.4, an Src UPD port value of 2000, a Dst IP value of 10.0.125.1, a Dst UDP port value of 3000, and a GTP-U TEID value of 0x043F12, Action type 2 is performed. That is, the header of the GTP-U packet is removed and the traffic is delivered to the upper layer in sequence, and information on the length of the packet is added to the value corresponding to counter ID 342.

In the case that traffic (or packets) arrives at the firewall and L4 load balancer, the process may be as follows. Action type1 described in the table means to drop a corresponding packet, and Action type 2 means to update the Dst IP address value and transmit the packet.

Specifically, if the Src IP address of the new traffic delivered to the firewall and the L4 load balancer is 196.0.83.0/24 (match), a corresponding traffic is dropped (Action type 2). Meanwhile, if the Src IP address of the new traffic is 143.0.1.3, the Dst IP address is 176.0.2.1, and the Dst TCP port value is 80 (match), the Dst IP address is updated to 10.0.1.5 and the traffic is transmitted to a corresponding address (action).

Figure 4:
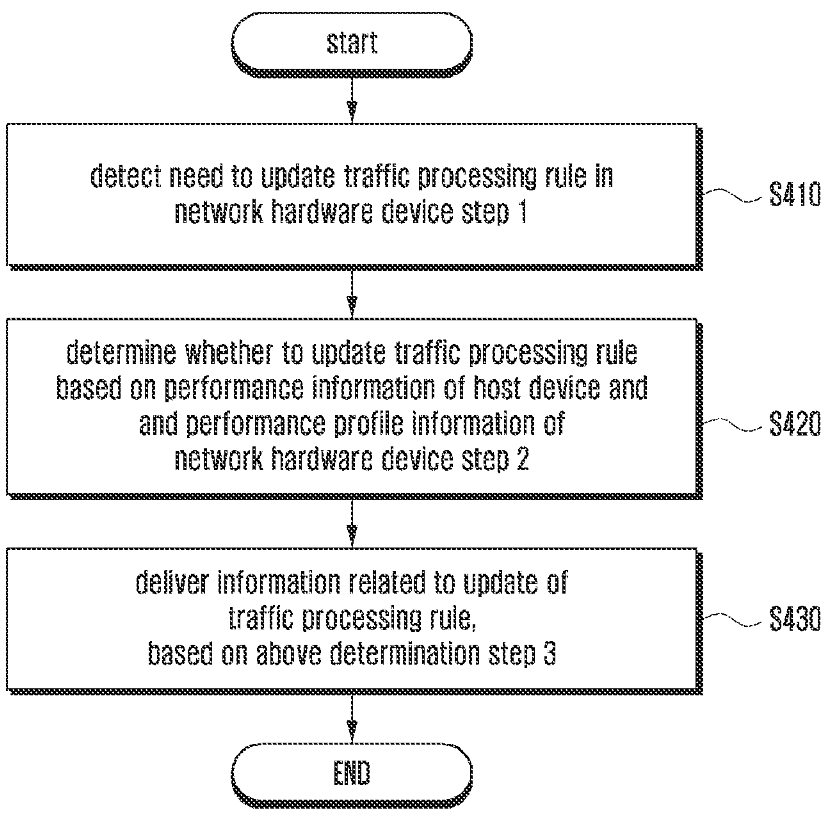
FIG. 4 is a flowchart illustrating a sequence of updating a traffic processing rule from a host device to a network hardware device according to an embodiment.

FIG. 4 is a flowchart illustrating a sequence of updating a traffic processing rule from the host device 201 to the network hardware device 204 according to an embodiment.

With reference to FIG. 2A, the host device 201 may update one or more traffic processing rules stored in the flow and session table 250 of the host device 201 to the flow and session table cache 251 of the network hardware device 204. Updating a traffic processing rule may include the case of adding a new traffic processing rule to the flow and session table cache 251 of the network hardware device 204 or the case of changing or deleting a previously existing traffic processing rule.

In Step S410, the host device 201 may detect a need to update the traffic processing rule stored in the flow and session table cache 251 of the network hardware device 204.

The case that the traffic processing rule needs to be updated may include the case that the traffic corresponding to a new flow and session is delivered to the host device 201, the case that a control message is received from an external host device 210, or the case that a timer expires, etc. Specific procedures will be described with respect to FIGS. 6 and 7.

In Step S420, the host device 201 may determine whether to update a traffic processing rule based on the performance profile information of the network hardware device 204.

In the process of determining whether to update the traffic handling rule, the host device 201 may consider a threshold of the update rate of the traffic processing rule based on the performance profile information of the network hardware device 204. A procedure for determining whether to update the traffic processing rule in consideration of the threshold will be described with reference to FIG. 8 (hereafter referred as a "control mechanism of an update rate of a traffic processing rule").

The performance profile information of the network hardware device 204 may be determined by receiving measurement information of the network hardware device 204 from the hardware performance profiler 280 of the network hardware device 204. It can also be obtained through the external host device 210. A procedure for obtaining the hardware performance profile information will be described in detail with reference to FIGS. 9 and 10.

In Step S430, in the case of determining that the traffic processing rule can be updated in the flow and session table cache 251 of the network hardware device 204, the host device 201 may deliver information related to the update of the traffic processing rule to the network hardware device 204.

In the case that the traffic processing rule cannot be updated, the host device 201 may not deliver the information related to the update of the traffic processing rule to the network hardware device 204 or may store the information related to the update of the traffic processing rule in an update waiting list existing in the hardware offload controller 230. The case that the traffic processing rule cannot be updated will be described in detail with reference to FIG. 11.

According to an embodiment, the update rate of the traffic processing rule may be adjusted in consideration of performance profile information of the network hardware device 204. Through this, the host device 201 and the network hardware device 204 can efficiently process traffic even in a situation where traffic processing rules are frequently changed.

Figure 5A:
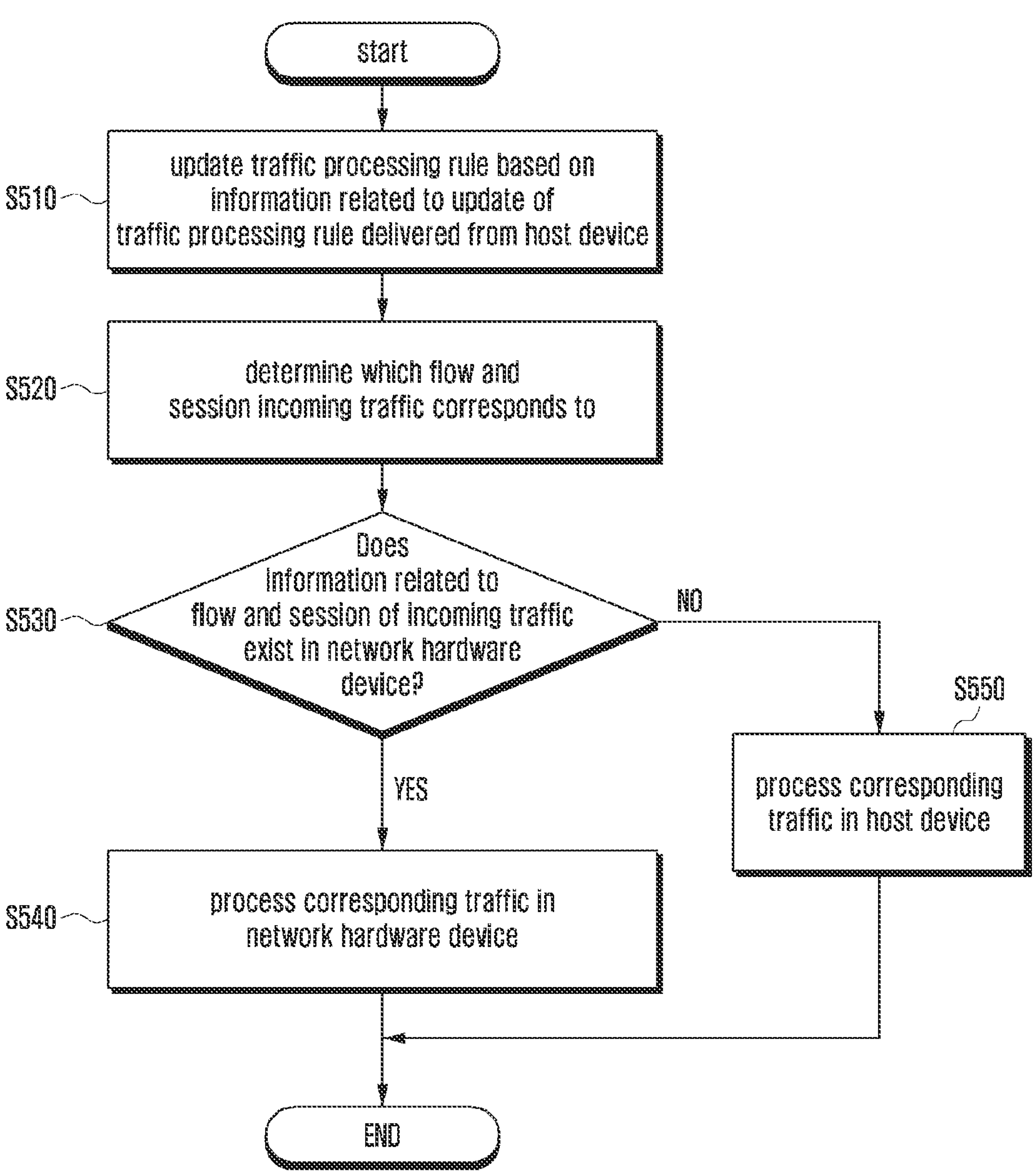
FIG. 5A is a flowchart illustrating a traffic processing process of a network hardware device in a case where a traffic processing rule is updated according to an embodiment.

FIG. 5A is a flowchart illustrating a traffic processing process of a network hardware device in a case where a traffic processing rule is updated according to an embodiment; According to the procedure described in FIG. 4, the host device 201 may determine whether to update the traffic processing rule to the network hardware device 204. Based on the above determination, the host device 201 may deliver the information related to the update of the traffic processing rule to the network hardware device 204. FIG. 5A illustrates a procedure performed in the network hardware device 204 receiving the information related to the update of the traffic processing rule.

In Step S510, the network hardware device 204 may update a new traffic processing rule to the flow and session table cache 251 of the network hardware device 204 based on the information related to the update of the traffic processing rule delivered from the host device 201. The host device 201 may determine whether to update the traffic processing rule in consideration of performance profile information of the network hardware device 204.

In Step S520, in the case of receiving traffic from the network 200, the network hardware device 204 may determine which flow and session the received traffic corresponds to.

In Step S530, the network hardware device 204 may determine whether the flow and session related information for the received traffic is stored in the updated flow and session table cache 251.

In the case that the information corresponding to the received traffic exists in the flow and session table cache 251 in the network hardware device 204 ("YES" in Step S530), an action corresponding to a corresponding flow and session may be performed. That is, the network hardware device 204 can process corresponding traffic in Step S540.

In the case that information corresponding to the received traffic does not exist in the flow and session table cache 251 in the network hardware device 204 ("NO" in Step S530), the received traffic may be delivered to the host device 201. That is, the host device 201 can process corresponding traffic in Step S550.

Here, whether the traffic processing rule corresponding to a specific flow and session exists in the flow and session table cache 251 may be determined for each flow and session. The determination may be dynamically determined at an initial start time of the network function or during operation of the network function.

Figure 5B:
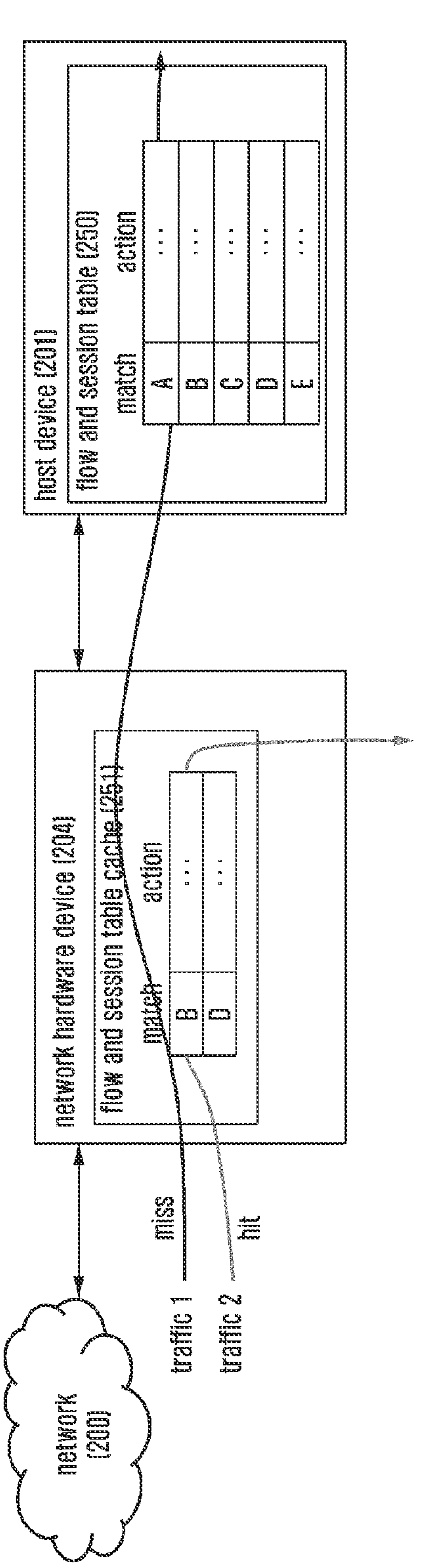
FIG. 5B illustrates a traffic processing process of a network hardware device in a case where a traffic processing rule is updated according to an embodiment.

FIG. 5B illustrates a traffic processing process of a network hardware device in a case where a traffic processing rule is updated according to an embodiment;

For example, the flow and session table 250 of the host device 201 may store conditions for determining that flows and sessions are A, B, C, D, and E, respectively, and information on the actions corresponding to each condition. The determination conditions for the flow and session when the flow and session corresponds to B and D, respectively, and corresponding actions at this time may be received from the host device 201 and stored in the flow and session table cache 251 of the network hardware device 204.

In the case of receiving traffic 1, the network hardware device 204 may determine which flow and session the traffic 1 corresponds to. In the case that traffic 1 corresponds to flow A, since information on flow A is not stored in the flow and session table cache 251 of the network hardware device 204, traffic 1 is delivered to the host device 201.

Meanwhile, in the case of receiving traffic 2, the network hardware device 204 may determine which flow and session the traffic 2 corresponds to. As a result of the determination, traffic 2 corresponds to flow B, and since the action to be performed in the case of flow B is stored in the flow and session table cache 251, the network hardware device 204 can process traffic 2.

FIG. 6 is a flowchart of the case where the host device 201 detects a need to change the traffic processing rule according to an embodiment.

The case where the traffic processing rule needs to be updated (see Step S410 of FIG. 4) may include the case of delivering the traffic corresponding to a new flow and session to the host device (in Step S600), and the case of receiving a control message from any external host device (in Step S650). Alternatively, a case in which the timer expires (in Step S690) may be included.

Hereinafter, a process of updating the traffic processing rule for each condition will be described. In the case of detecting a need to update the traffic processing rule, whether to update the traffic processing rule may be determined according to the control mechanism of the update rate of the traffic processing rule. The control mechanism of the update rate of the traffic handling rule will be described below in FIG. 8.

First, in the case of receiving the traffic corresponding to a new flow and session by the host device 201, it may be determined that a need to update traffic processing rule is detected.

In Step S600, the network function 220 of the host device may receive traffic corresponding to the flow and session for which related information is not stored in the flow and session table 250 of the host device 201. The network function 220 receiving the traffic may determine a traffic processing rule for the received traffic. The network function 220 of the host device 201 may deliver the determined traffic processing rule to the hardware offload controller 230.

In Step S610, the hardware offload controller 230 may identify whether there is a resource (which may be used in the same meaning as "place" or "space") for updating the determined traffic processing rule in the flow and session table cache 251 of the network hardware device 204.

In the case where there is no free resource (or place, space) in the flow and session table cache 251 of the network hardware device 204, the hardware offload controller 230 may determine not to update the determined traffic processing rule. Alternatively, information related to the determined traffic processing rule may be stored in a waiting list of the hardware offload controller 230 in Step S640.

In the case where there is an empty resource (place, space) in the flow and session table cache 251 in the network hardware device 204, the hardware offload controller 230 may calculate an update rate of a previous traffic processing rule in Step S620.

In the case where the update rate of the previous traffic processing rule is less than or equal to a threshold, the information related to the update of the determined traffic processing rule may be delivered to the network hardware device in Step S650.

In the case where the update rate of the previous traffic processing rule exceeds the threshold, it is determined not to update the determined traffic processing rule or information related to the determined traffic processing rule may be stored in the waiting list of the hardware offload controller 230 in Step S640.

In another embodiment, in the case of receiving the control message related to a state change of a specific flow and session by the host device 201, it may be determined that a need to update traffic processing rule is detected.

In Step S650, the host device 201 may receive the control message related to a state change of a specific flow and session. For example, the network hardware device 204 may receive a control message from the external host device 210 and deliver it to the network function 220 of the host device 201. Upon receiving the control message, the network function 220 may deliver information related to a state change of a specific flow and session to the hardware offload controller 230 based on the control message.

In Step S660, the hardware offload controller 230 may select a traffic processing rule related to a state change, corresponding to a specific flow and session based on the control message received from the external host device 210.

In Step S670, the hardware offload controller 230 may determine whether the update rate of the previous traffic processing rule is less than or equal to a threshold. In the case where the update rate of the previous traffic processing rule is less than or equal to the threshold, the information related to the update of the determined traffic processing rule may be delivered to the network hardware device 204 in Step S680.

In the case where the update rate of the previous traffic processing rule exceeds the threshold, it is determined not to update the determined traffic processing rule or the information related to the determined traffic processing rule may be stored in the waiting list of the hardware offload controller 230 in Step S640.

In the case of following the above procedure, the host device 201 and the network hardware device 204 can efficiently process traffic by receiving the control message and immediately determining whether to update the traffic processing rule, thereby increasing the ratio of traffic to be processed by the network hardware device.

In another embodiment, in the case where a periodically operating timer expires, it may be determined that a need to update traffic processing rule is detected.

In Step S690, the host device 201 may detect that a periodically operating timer has expired.

In Step S660, the hardware offload controller 230 of the host device 201 may select a traffic processing rule that needs to be updated. The traffic processing rule that needs to be updated may include a traffic processing rule that is infrequently used or has not been used for a long time, or a traffic processing rule stored in the update waiting list of the hardware offload controller 230.

In Step S670, it may be determined whether the update rate of the previous traffic processing rule is less than or equal to a threshold. In the case where the update rate of the previous traffic processing rule is less than or equal to the threshold, information related to the traffic processing rule selected as needing to be updated may be delivered to the network hardware device 204 in Step S680.

In the case where the update rate of the previous traffic processing rule exceeds the threshold, it is determined not to update the selected traffic processing rule or information related to the selected traffic processing rule may be stored in the waiting list of the hardware offload controller 230 in Step S640.

Figure 7:
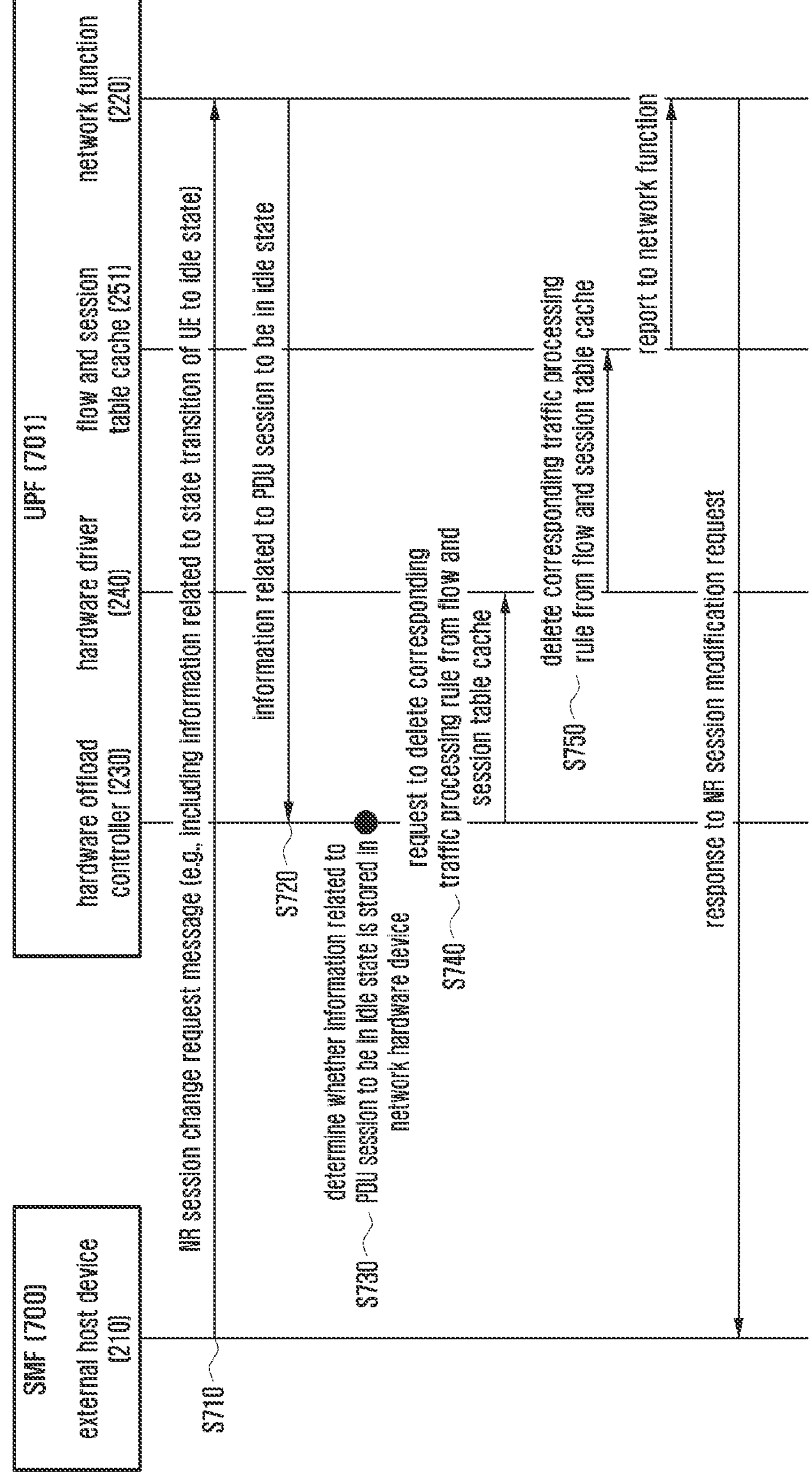
FIG. 7 illustrates a specific example when the disclosure is applied to a communication system according to an embodiment.

FIG. 7 illustrates a specific example when the disclosure is applied to a communication system according to an embodiment.

Specifically, FIG. 7 illustrates the case of receiving the control message related to a state change of a specific flow and session by the host device 201 applied to a communication system.

In FIG. 7, a UPF 701 may include the host device 201 and the network hardware device 204. In this case, the UPF 701 may include the hardware offload controller 230 and hardware driver 240 of the host device, and may include the flow and session table cache 251 of the network hardware device 204. A session management function (SMF) 700 may correspond to the external host device 210, and the SMF may deliver information related to a PDU session to a network component (UPF, policy control function (PCF), or user data management (UDM)).

A control message received from the SMF 700 may include information related to state transition of a specific flow and session. The state transition may include transition of a specific PDU session between an idle state and an active state. FIG. 7 illustrates a case in which a specific PDU session transitions to an idle state, but the disclosure is not limited thereto.

In an access network (AN) release procedure that occurs due to inactivation of the terminal or loss of connection, etc., the process of deleting the traffic processing rule of the PDU session related to the terminal to be deactivated from the flow and session table cache 251 in the network hardware device 204 may be as follows.

At S710, the UPF 701 may receive the NR session change request message from the SMF 700. The NR session change request message may include information related to the terminal becoming idle.

At S720, the network function 220 may deliver to the hardware offload controller 230 information related to the fact that a specific PDU session is in an idle state in relation to the terminal.

At S730, the hardware offload controller 230 may determine whether the traffic processing rule related to the specific PDU session is stored in the flow and session table cache 251 of the network hardware device.

At S740, in the case that the traffic processing rule related to a corresponding PDU session is stored in the flow and session table cache 251, the hardware offload controller 230 may request the hardware driver 240 to delete the traffic processing rule related to the PDU session from the flow and session table cache 251 of the network hardware device 204.

At S750, the hardware driver 240 may deliver the information related to deletion of traffic processing rule of the PDU session in the idle state from the flow and session cache table cache 251.

Likewise, in the case that a control message notifying that a specific PDU session is activated arrives, the network function 220 may request to add a traffic processing rule related to a specific PDU session to the flow and session table cache 251 through the hardware offload controller 230.

In the case following the above procedure, thousands of idle sessions are generated per second on a busy hourly basis in a commercial environment in which traffic processing rules are frequently changed according to terminal mobility. In this case, traffic processing efficiency can be increased by deleting traffic processing rules with low frequency of use and immediately determining whether to update traffic processing rules with high frequency of use.

Figure 8:
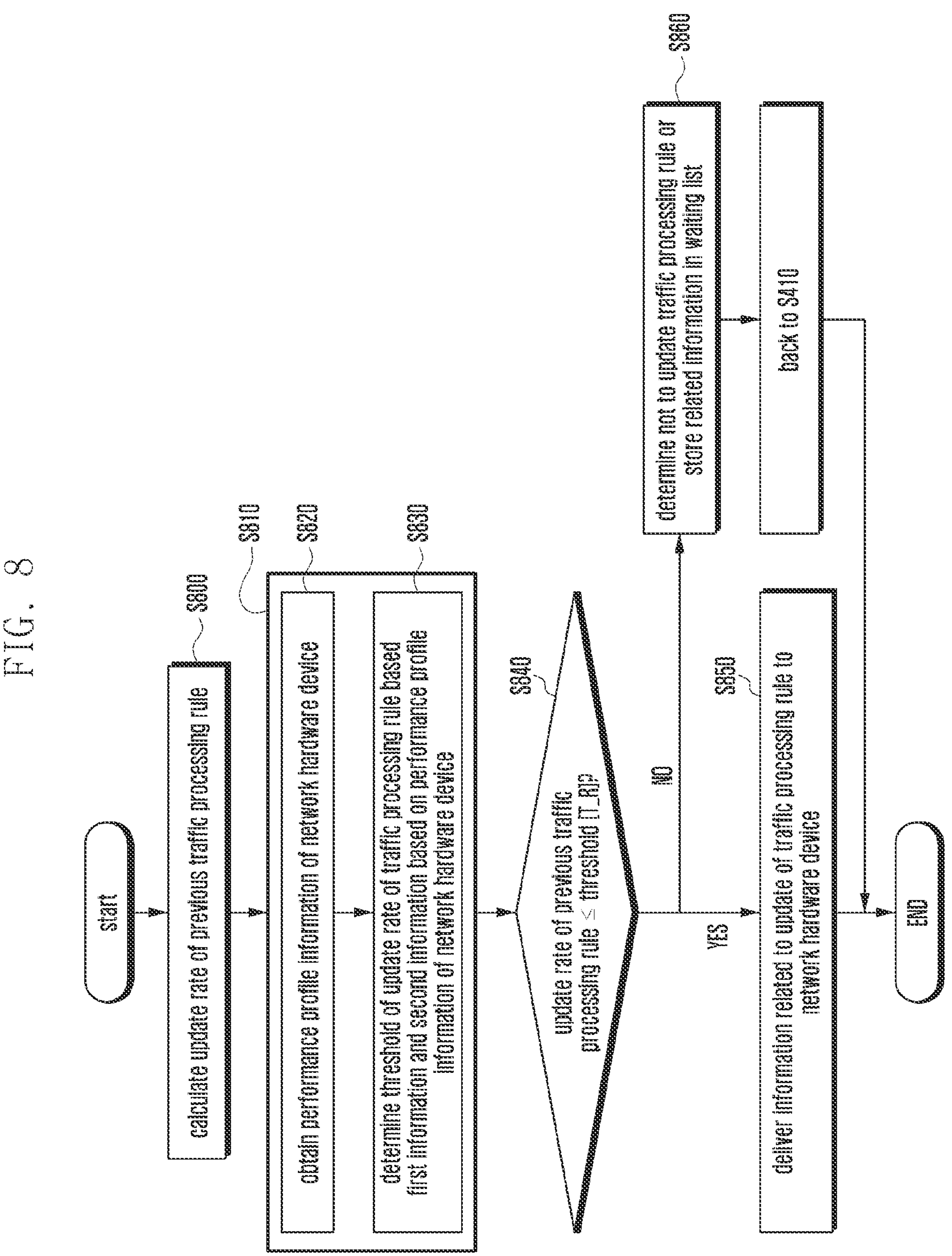
FIG. 8 is a flowchart illustrating a process of determining whether to update a traffic processing rule based on performance profile information of a network hardware device according to an embodiment.

FIG. 8 is a flowchart illustrating a process of determining whether to update a traffic processing rule based on performance profile information of the network hardware device 204 according to an embodiment.

Specifically, after the host device detects a need to update the traffic processing rule (at Step S410 of FIG. 4), the update rate of the traffic processing rule may be considered based on the performance profile information of the network hardware device 204. The flowchart illustrates a process of determining whether to update a traffic processing rule in consideration of the update rate of the traffic processing rule. In this case, the hardware offload controller 230 may control the update rate of the traffic processing rule to be less than or equal to a threshold T_R.

In Step S800, the hardware offload controller 230 may calculate the update rate of a previous traffic processing rule through a value obtained by dividing the number of times the traffic processing rule is updated by unit time during previous unit time (e.g., every 1 second).

At S810, the host device 201 may determine a threshold of the update rate of the traffic processing rule based on the performance profile information of the network hardware device. The specific procedure is as follows:

Performance Profile Information of a Network Hardware Device

In Step S820, the hardware offload controller 230 may obtain the performance profile information of the network hardware device. The performance profile information of the network hardware device includes indicators that affect system performance when determining whether to update the traffic processing rule, and may include the following information:

- Total transmission capacity according to the number of traffic processing rules updated per unit time
- Transmission delay time according to the number of traffic processing rules updated per unit time
- That is, the performance profile information of the network hardware device 204 may include information related to the total transmission capacity and transmission delay time of traffic (or packets) in the network hardware device 204 according to the number of traffic processing rules updated from the host device 201 to the network hardware device 204.

The performance profile information of the network hardware device may be obtained by receiving a related measurement value from the hardware performance profiler 280 or may be directly obtained from the external host device 210. A process of receiving the related measurement value from the hardware performance profiler 280 will be described in detail with reference to FIG. 9. The process of obtaining the performance profile information of the network hardware device 204 from the external host device 210 will be described in detail with reference to FIG. 10.

Calculation Method of a Threshold

In Step S830, the hardware offload controller 230 may determine a threshold of the update rate of the traffic processing rule. The threshold may be determined based on the performance profile information of the network hardware device 204 and packet transmission rate and transmission delay requirements required by a network operator. The threshold may be triggered and newly calculated whenever the traffic processing rule is to be updated. However, the procedure for calculating the threshold is not limited thereto, and the threshold may be calculated in other ways. The threshold calculation procedure is as follows:

Consideration of the Packet Transmission Rate Requirements of the Network Hardware Device 204

In the case where there is a requirement (e.g., X Gbps or more) for the transmission rate per traffic (or packet) of the network hardware device 204 defined by a network operator, the hardware offload controller 230 may configure a maximum value of the update rate of the traffic processing rule within the range that can satisfy the above condition as a threshold T_R1. In the case where there is no separate requirement for the transmission rate defined by the network operator, the hardware offload controller 230 may configure the maximum value of the update rate of the traffic processing within a range capable of maintaining the maximum transmission rate of the traffic (or packet) of the network hardware device 204 as the threshold T_R1.

Consideration of Packet Transmission Delay Time Requirements of the Network Hardware Device 204

In the case where there is a transmission delay time requirement (e.g., Y μs or less) per traffic (or packet) of the network hardware device 204 defined by the network operator, the hardware offload controller 230 may configure the maximum value of the update rate of the traffic processing rule within the range that satisfies the condition as the threshold T_R2. In the case where there is no transmission delay time requirement defined by the network operator, the hardware offload controller 230 may configure T_R2 to be an infinitely large value.

Determination of a Final Threshold

Then, the hardware offload controller 230 may configure a smaller value of the two threshold values T_R1 and T_R2 as T_R corresponding to a final threshold.

Thereafter, the hardware offload controller 230 may adjust the update rate of the traffic processing rule so as not to exceed the threshold T_R.

Although FIG. 8 illustrates the operation of calculating the update rate of the previous traffic processing rule (Step S800) prior to the operation of calculating the threshold of the update rate of the traffic handling rule (operation S810), the sequence illustrated in FIG. 8 is not necessarily followed. The operation of calculating the threshold (operation S810) may be performed before or simultaneously with the operation of calculating the update rate of the traffic processing rule (Step S800).

In Step S840, it may be determined whether the update rate of the previous traffic processing rule is less than or equal to the threshold T_R.

In the case where the update rate of the previous traffic processing rule calculated in Step S840 is less than or equal to the threshold T_R, the host device 201 may deliver the information related to the update of the traffic processing rule to the network hardware device 204 in Step S850.

In Step S860, in the case where the calculated update rate of the previous traffic processing rule exceeds the threshold T_R, it may be determined not to update the traffic processing rule. Alternatively, information related to the traffic processing rule may be stored in a waiting list of the hardware offload controller 230.

Figure 9:
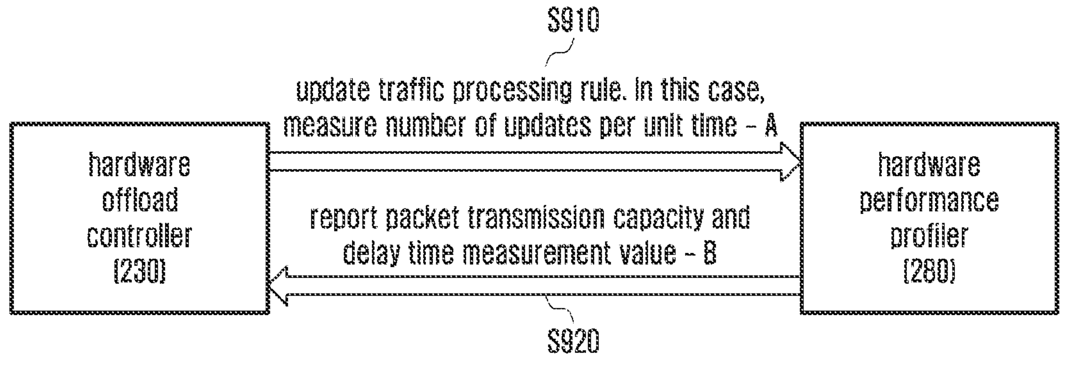
FIG. 9 illustrates a method in which a hardware offload controller receives information from a network hardware device to derive performance profile information of a network hardware device according to an embodiment.

FIG. 9 illustrates a method in which the hardware offload controller 230 receives measurement information from the network hardware device 204 to derive performance profile information of the network hardware device 204 according to an embodiment.

The performance profile information of the network hardware may include the following information:

- Total transmission capacity according to the number of traffic processing rules updated per unit time Transmission delay time according to the number of traffic processing rules updated per unit time A method in which the hardware offload controller 230 receives measurement information from the network hardware device 204 to derive the performance profile information of the network hardware device may be as follows:

Measurement by the Hardware Offload Controller 230

In operation S910, the hardware offload controller 230 may measure the number of traffic processing rules updated per unit time (e.g., every 1 second).

Reception of Information Including a Measurement Value from the Hardware Performance Profiler 280

Network hardware devices 204 may support their own hardware performance profiler module. Alternatively, a user may directly implement and add a hardware performance profiler 280.

The hardware performance profiler 280 may exist in the host device 201 and may exist in a different server from the network hardware device 204. In the following, a description will be made based on an embodiment in which the hardware performance profiler 280 exists in the network hardware device 204, but the disclosure is not necessarily limited thereto.

Measurement by the Hardware Performance Profiler 280

The hardware performance profiler 280 may measure a traffic (or packet) transmission rate (or average transmission capacity) and a delay time value per average traffic (or packet) of the network hardware device 204. The measurement may be performed in the process of updating traffic processing rules for test purposes in the initial stage of connection between the host device 201 and the external host device 210. Alternatively, the measurement may be performed in a network function operation of processing traffic.

Reception of Related Information from the Hardware Performance Profiler 280

In operation S920, the hardware offload controller 230 may receive the measurement values from the hardware performance profilers 280. Also, a timestamp value for the current time of the network hardware device 204 may be received.

Reception may be performed through a host-device interface, and the interface may be as follows. The hardware performance profiler 280 may exist within the network hardware device 204. In the case that the network hardware device 204 including the hardware performance profiler 280 and the host device 201 exist in the same server, the network hardware device 204 and the host device 201 may transmit and receive a message including the above information through PCIe or a DMA channel. Alternatively, in the case that the network hardware device 204 including the hardware performance profiler 280 and the host device 201 exist in different servers, the network hardware device 204 and the host device 201 may transmit and receive the messages including the above information through an Ethernet or an RDMA channel. However, the disclosure is not limited thereto, and messages can be transmitted and received through various methods.

The process of transmitting and receiving information between the host device 201 and the network hardware device 204 is not limited to a specific type of protocol or message. In addition, the information may be transmitted every unit time. Alternatively, the information collected over several unit times may be collected and transmitted.

Obtaining Performance Profile Information of the Network Hardware Device

The hardware performance profiler 280 operating in the network hardware device 204 and the hardware offload controller 230 operating in the host device 201 may synchronize values to be used as unit time (e.g., 1 second) in advance, and maintain the values at the same value.

The hardware offload controller 230 may repeat the above procedure every unit time to accumulate and store maximum transmission capacity value information according to the number of traffic processing rules updated per unit time. In addition, the hardware offload controller 230 may accumulate and store the average delay time value information according to the number of traffic processing rules updated per unit time. Through the above information, it is possible to derive a relationship function between the number of traffic processing rules updated per unit time, the maximum transmission capacity of packet, and the average delay time, that is, the performance profile information of the network hardware device.

Figure 10:
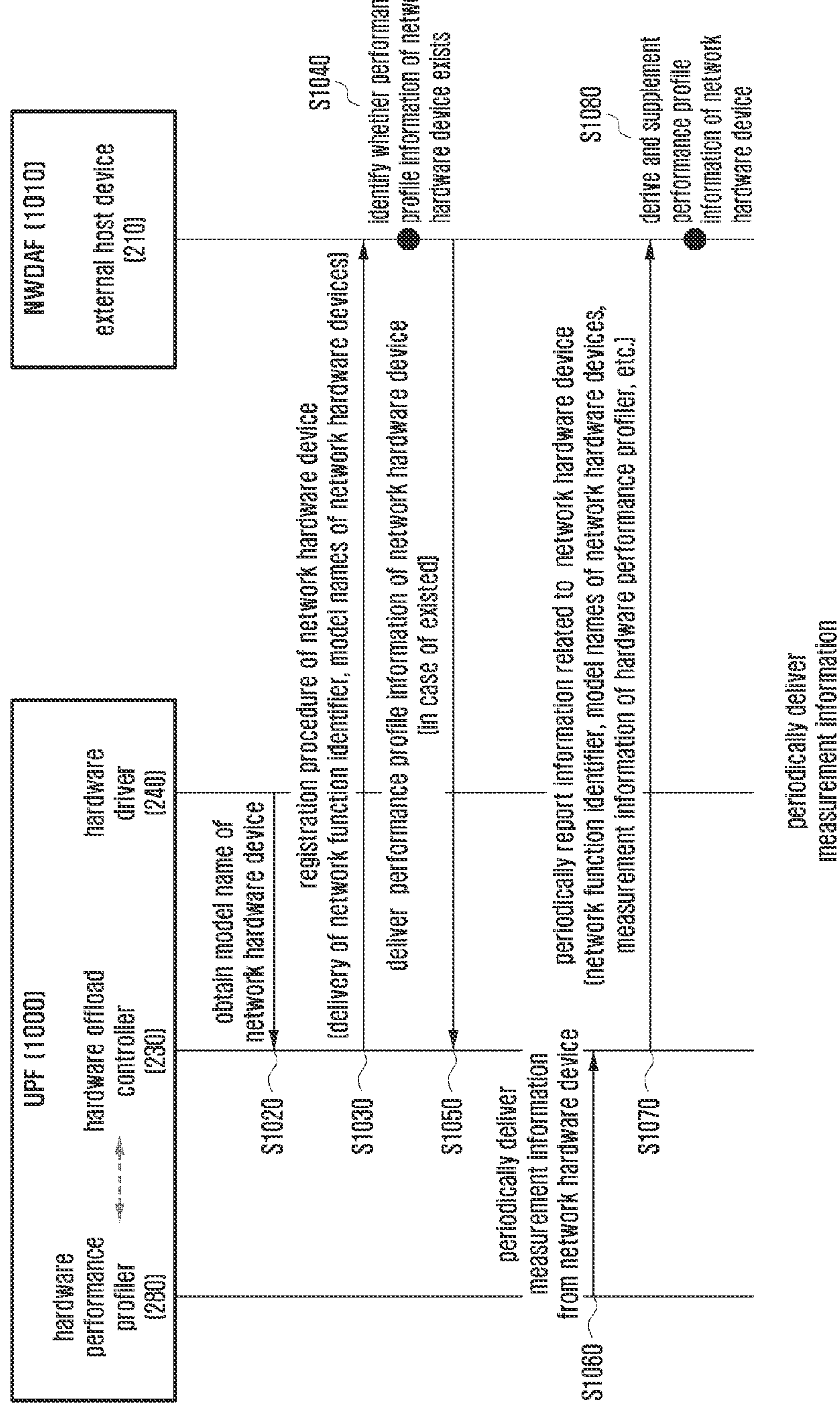
FIG. 10 illustrates a method of obtaining performance profile information of a network hardware from an external host device according to an embodiment.

FIG. 10 illustrates a method of obtaining the performance profile information of the network hardware device from an external host device according to an embodiment.

In FIG. 10, a UPF 1000 may include the host device 201 and the network hardware device 204. The UPF 1000 may include the hardware offload controller 230 and hardware driver 240 of the host device 201, and the hardware performance profiler 280 of the network hardware device 204. The external host device 210 may operate a network data analytics function (NWDAF) 1010, and the NWDAF may provide network data analysis function for network automation in a 5G communication system. FIG. 10 is described based on UPF and NWDAF, but the disclosure is not necessarily limited thereto.

The network functions using the same network hardware device through the external host device 210 and the performance profile information of the network hardware device 204 may be shared. Accordingly, the hardware offload controller 230 may receive the performance profile information of the network hardware device 204 from the external host device 210.

The network hardware performance profile information may include the following information:

1) Total transmission capacity according to the number of traffic processing rules updated per unit time
2) Transmission delay time according to the number of traffic processing rules updated per unit time In operation S1020, the hardware offload controller 230 may obtain the model name of the network hardware device 204 connected to a current network interface from the hardware driver 240 of the UPF 1000. The hardware offload controller 230 may obtain the model name when a network function starts.

After the network function starts, the hardware offload controller 230 may identify whether the NWDAF 1010 running in the external host device 210 exists in the same network. In the case where the running NWDAF 1010 exists, the hardware offload controller 230 may perform a connection with the NWDAF 1010. The messages exchanged through the connection can be delivered through a service-based interface (SBI) based HTTP REST API. Alternatively, communication is possible through an arbitrarily defined interface (e.g., a remote procedure call (RPC)) as needed.

In operation S1030, the hardware offload controller 230 may deliver its current network function identifier (e.g., UPF ID) and model names of the installed network hardware devices 204 to the external host device 210 running the NWDAF 1010.

In operation S1040, the NWDAF 1010 may identify whether the performance profile information of the network hardware device received from the network function previously connected to the same network hardware device exists through the received model name of the network hardware device 204.

In the case where the performance profile information of the network hardware device exists in operation S1050, the hardware offload controller 230 may receive the performance profile information of the network hardware device from the NWDAF 1010, store it as an initial value, and use it for adjusting the update rate of the traffic processing rule.

In operation S1060, the hardware offload controller 230 may periodically receive a measurement value from the hardware performance profiler 280 even after receiving the initial value from the NWDAF 1010, and the hardware offload controller 230 may continuously correct the performance profile information of the network hardware device according to the above-described procedure.

In operation S1070, the NWDAF 1010 may receive the number of the traffic processing rules updated and the measurement values of the traffic transmission rate and transmission delay time per packet of the network hardware device 204 within a unit time from the hardware offload controller 230.

In operation S1080, the NWDAF 1010 may continuously derive and correct the performance profile information of the network hardware device for each network hardware device through the above-mentioned procedure.

FIG. 11 is a flowchart illustrating a case of storing information related to the traffic processing rule in the waiting list of the hardware offload controller 230 in the case where the traffic processing rule cannot be updated according to an embodiment.

As a result of determining whether the traffic processing rule of the hardware offload controller 230 is updated (in Step S420 of FIG. 4), in the case of determining that the traffic processing rule cannot be updated, the information related to the update of the traffic processing rule may be stored in the waiting list of the hardware offload controller 230 and may be updated later.

Specifically, the case of determining that the traffic processing rule cannot be updated may include the case in which an empty resource of the flow and session table cache 251 does not exist in the network hardware device 204 as described above. Alternatively, the case of determining may include the case in which the update rate of the traffic processing rule exceeds a threshold.

In the case where the traffic processing rule cannot be updated, in Step S1110, the hardware offload controller 230 may store the information related to the update of the traffic processing rule in an update waiting list in the hardware offload controller 230. The information related to the update of the traffic processing rule may include flow and session information, whether a corresponding traffic processing rule is added, deleted and changed, or information on the traffic processing rule to be added in the case of adding the traffic processing rule.

In Step S1120, the hardware offload controller 230 may periodically derive the information related to the update of the traffic processing rule from the update waiting list.

In Step S1130, the hardware offload controller 230 may determine whether there is an updatable traffic processing rule based on the derived information, and in the case where the update is possible, in Step S1140, the hardware offload controller 230 may determine whether the update rate of the previous traffic processing rule is less than or equal to a threshold.

In Step S1150, in the case where the update rate of the previous traffic processing rule is less than or equal to a threshold, the hardware offload controller 230 may determine to update the traffic processing rule.

In the case where the previous update rate of the cache exceeds the threshold in Step S1140, the hardware offload controller 230 may maintain or delete the information currently stored in the waiting list in Step S1110.

Figure 12:
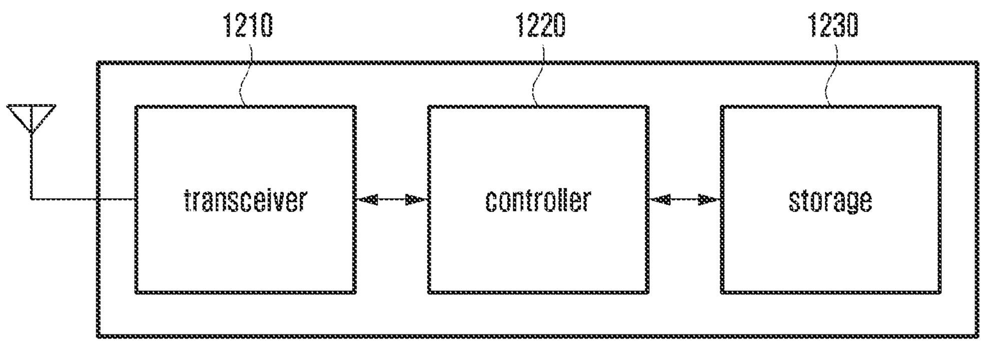
FIG. 12 illustrates a structure of a host device according to an embodiment.

FIG. 12 illustrates a structure of a host device.

With reference to FIG. 12, a host device may include a transceiver 1210, a controller 1220, and a storage 1230. In the disclosure, the controller may be defined as a circuit, an application-specific integrated circuit, or at least one processor.

The transceiver 1210 may transmit or receive signals to/from other network entities. The transceiver 1210 may receive, for example, a synchronization signal or a reference signal.

The controller 1220 may control the overall operation of an electronic device according to an embodiment. For example, the controller 1220 may control signaling flow between blocks to accomplish the operations according to a flowchart described herein.

The storage 1230 may store at least one of information transmitted and received through the transceiver 1210 and information generated through the controller 1220.

Figure 13:
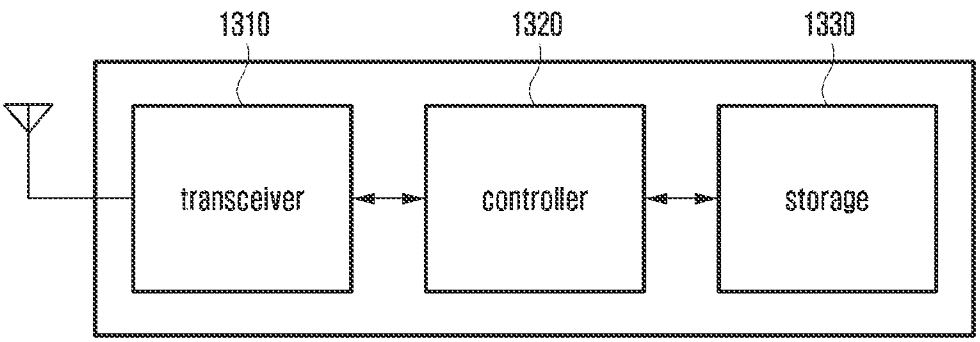
FIG. 13 illustrates a structure of a network hardware device according to an embodiment.

FIG. 13 illustrates a structure of a network hardware device.

With reference to FIG. 13, a network hardware device may include a transceiver 1310, a controller 1320, and a storage 1330. In the disclosure, the controller 1320 may be defined as a circuit, an application-specific integrated circuit, or at least one processor.

The transceiver 1310 may transmit or receive signals to/from other network entities.

The controller 1320 may control the overall operation of the network hardware device according to an embodiment. For example, the controller 1320 may control the flow between blocks to accomplish the operations according to a flowchart described herein.

The storage 1330 may store at least one of information transmitted and received through the transceiver 1310 and information generated through the controller 1320.

According to an embodiment, the traffic processing function of the host device may be improved by the network hardware device performing part of the traffic processing function of the host device.

According to an embodiment, the host device can improve the traffic processing and transmission performance of the network hardware device by offloading traffic on the network hardware device in consideration of the performance of the network hardware device.

According to another embodiment, by removing the traffic processing rule related to the flow and session in an idle state and adding the traffic processing rule related to the flow and session in an active state to the cache of the network hardware device, it is possible to improve the number of traffic that can be processed in the network hardware device.

The embodiments of the disclosure disclosed in this specification and drawings are provided only as illustrative examples to easily describe technical details of the disclosure and help the understanding of the disclosure and are not intended to limit the scope of the disclosure. That is, it will be obvious to those skilled in the art to which the disclosure pertains that other modifications based on the technical idea of the disclosure may be carried out.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a first device in a communication system, the method comprising:

detecting a need to update a traffic processing rule in a second device processing traffic together with the first device;

determining whether to update the traffic processing rule to be used in the second device based on performance information of the first device and performance profile information of the second device; and delivering, to the second device, information related to the update of the traffic processing rule based on the determination, wherein the performance profile information of the second device includes:

a maximum transmission capacity of a packet of the second device according to a number of traffic processing rules transmitted from the first device to the second device per unit time; and an average transmission delay time of the packet according to the number of the traffic processing rules.

2. The method of claim 1, wherein the performance profile information of the second device is determined based on measurement information of the second device received from the second device, and wherein the measurement information of the second device includes a measurement value of a packet transmission rate and a packet transmission delay time of the second device per unit time.

3. The method of claim 1, wherein the performance profile information of the second device is received from a third device, and the third device operates a module providing a data analysis function.

4. The method of claim 1, wherein determining whether to update the traffic processing rule is based on first information being determined based on the performance profile information of the second device and second information related to a requirement for a packet transmission rate of the second device and a requirement for a transmission delay time for each packet of the second device, and wherein the second information is defined by a network operator.

5. The method of claim 4, wherein determining whether to update the traffic processing rule includes:

comparing a threshold of an update rate of the traffic processing rule determined based on the first information and the second information with an update rate of a previous traffic processing rule; and determining to update the traffic processing rule in case that the update rate of the previous traffic processing rule is less than or equal to the threshold of the update rate of the traffic processing rule.

6. The method of claim 5, further comprising:

storing information related to the traffic processing rule to be updated to the second device in case that the update rate of the previous traffic processing rule exceeds the threshold.

7. The method of claim 1, wherein detecting the need to update the traffic processing rule in the second device is determined by receiving a control message from a fourth device.

8. The method of claim 7, wherein the control message includes information related to whether a protocol data unit (PDU) session corresponding to a specific flow and session transitions to an idle state.

9. A method performed by a second device processing traffic together with a first device in a communication system, the method comprising:

measuring a packet transmission rate and a packet transmission delay time of the second device per unit time;

delivering, to the first device, measurement information including a measurement value of the packet transmission rate and the packet transmission delay time measured per the unit time to the first device, the measurement information being used to determine whether to update a traffic processing rule by the first device;

receiving, from the first device, information related to the traffic processing rule determined based on the measurement information;

updating the traffic processing rule based on the information related to the traffic processing rule;

processing first traffic related to the updated traffic processing rule in case of receiving the first traffic; and delivering, to the first device, second traffic that is not related to the updated traffic processing rule in case of receiving the second traffic.

10. A first device in a communication system, the first device comprising:

a transceiver to transmit and receive a signal; and a controller connected to the transceiver, wherein the controller is configured to:

detect a need to update a traffic processing rule in a second device processing traffic together with the first device, determine whether to update the traffic processing rule to be used in the second device based on performance information of the first device and performance profile information of the second device, and deliver, to the second device, information related to the update of the traffic processing rule based on the determination, and wherein the performance profile information of the second device includes:

a maximum transmission capacity of a packet of the second device according to a number of traffic processing rules transmitted from the first device to the second device per unit time; and an average transmission delay time of the packet according to the number of the traffic processing rules.

11. The first device of claim 10, wherein the performance profile information of the second device is determined based on measurement information of the second device received from the second device, and wherein the measurement information of the second device includes a measurement value of a packet transmission rate and a packet transmission delay time of the second device per unit time.

12. The first device of claim 10, wherein the performance profile information of the second device is received from a third device, and the third device operates a module providing a data analysis function.

13. The first device of claim 10, wherein determining whether to update the traffic processing rule is based on first information being determined based on the performance profile information of the second device and second information related to a requirement for a packet transmission rate of the second device and a requirement for a transmission delay time for each packet of the second device, and wherein the second information is defined by a network operator.

14. The first device of claim 13, wherein the controller is configured to:

compare a threshold of an update rate of the traffic processing rule determined based on the first information and the second information with an update rate of a previous traffic processing rule, and determine to update the traffic processing rule in case that the update rate of the previous traffic processing rule is less than or equal to the threshold of the update rate of the traffic processing rule.

15. The first device of claim 14, wherein the controller is further configured to store information related to the traffic processing rule to be updated to the second device in case that the update rate of the previous traffic processing rule exceeds the threshold.

16. The first device of claim 10, wherein the controller is further configured to receive a control message from a fourth device and detects the need to update the traffic processing rule in the second device.

17. The first device of claim 16, wherein the control message includes information related to whether a protocol data unit (PDU) session corresponding to a specific flow and session transitions to an idle state.

18. A second device which processes traffic together with a first device in a communication system, the second device comprising:

a transceiver to transmit and receive a signal; and a controller coupled to the transceiver, wherein the controller is configured to:

measure a packet transmission rate and a packet transmission delay time of the second device per unit time, and deliver, to the first device, measurement information including a measurement value of the packet transmission rate and the packet transmission delay time measured per the unit time, the measurement information being used to determine whether to update a traffic processing rule by the first device, receive, from the first device, information related to the traffic processing rule determined based on the measurement information, update the traffic processing rule based on the information related to the traffic processing rule, process first traffic related to the updated traffic processing rule in case of receiving the first traffic, and deliver, to the first device, second traffic that is not related to the updated traffic processing rule in case of receiving the second traffic.

* * * * *